United States Patent
Wihlidal (10) Patent No.: US 10,930,020 B2
(45) Date of Patent: Feb. 23, 2021

(54) TEXTURE COMPRESSION USING A NEURAL NETWORK

(71) Applicant: Electronic Arts Inc., Redwood City, CA (US)

(72) Inventor: Graham Wihlidal, Stockholm (SE)

(73) Assignee: ELECTRONIC ARTS INC., Redwood City, CA (US)

( * ) Notice: Subject to any disclaimer, the term of this patent is extended or adjusted under 35 U.S.C. 154(b) by 112 days.

(21) Appl. No.: 16/059,985

(22) Filed: Aug. 9, 2018

(65) Prior Publication Data
US 2020/0051287 A1 Feb. 13, 2020

(51) Int. Cl.
*G06T 9/00* (2006.01)
*G06N 3/08* (2006.01)
(Continued)

(52) U.S. Cl.
CPC ............. *G06T 9/002* (2013.01); *G06N 3/084* (2013.01); *G06T 7/11* (2017.01); *G06T 15/04* (2013.01);
(Continued)

(58) Field of Classification Search
CPC ....... G06T 9/002; G06T 15/04; H04N 19/103; H04N 19/176; H04N 19/189; H04N 19/94; G06N 3/084
See application file for complete search history.

(56) References Cited

U.S. PATENT DOCUMENTS

2018/0308256 A1* 10/2018 Appu ................. G06T 9/00
2019/0304438 A1* 10/2019 Qian ................. G10L 15/063
(Continued)

OTHER PUBLICATIONS

Reed, Nathan, Understanding BCn Texture Compression Formats, Nathan Reed's Coding Blog, Feb. 12, 2012, 17 pages, Retrieved from http://reedbeta.com/blog/understanding-bcn-texture-compression-formats/.
(Continued)

*Primary Examiner* — Zhitong Chen
(74) *Attorney, Agent, or Firm* — Middleton Reutlinger (57) ABSTRACT

A computer-implemented method comprises receiving a texture map, segmenting the texture map into a plurality of pixel regions, and for each of the plurality of pixel regions, inputting a vector representation of the pixel region to a compression parameter neural network. The compression parameter neural network is configured to process the vector representation of the pixel region through one or more layers of the compression parameter neural network and generate an output indicating a compression parameter set for compressing the pixel region. The method further comprises inputting the pixel region and the compression parameter set to a compressor, wherein the compressor is configured to compress the pixel region to a compressed representation of the pixel region in accordance with the compression parameter set. A compressed representation of the texture map is stored to a memory accessible by a graphics processing unit, wherein storing the compressed representation of the texture map comprises storing the compressed representations of each of the pixel regions to said memory. The compressed representation of the texture map is selectively decompressed using the graphics processing unit.

20 Claims, 7 Drawing Sheets

(51) Int. Cl.
*H04N 19/189* (2014.01)
*H04N 19/176* (2014.01)
*G06T 7/11* (2017.01)
*H04N 19/103* (2014.01)
*G06T 15/04* (2011.01)
*H04N 19/94* (2014.01)
*H04N 19/463* (2014.01)

(52) U.S. Cl.
CPC ......... *H04N 19/103* (2014.11); *H04N 19/176* (2014.11); *H04N 19/189* (2014.11); *H04N 19/463* (2014.11); *H04N 19/94* (2014.11)

(56) References Cited

U.S. PATENT DOCUMENTS

2019/0335183 A1* 10/2019 Patel ................... H04N 19/176
2020/0105030 A1* 4/2020 Fuller ................... G06N 20/00

OTHER PUBLICATIONS

Microsoft, Texture Block Compression in Direct3D 11, Microsoft-Windows Dev Center, May 30, 2018, 4 pages, Retrieved from https://docs.microsoft.com/en-us/windows/desktop/direct3d11/texture-block-compression-in-direct3d-11.

Liciatenbelt, Barthold et al., ARB Texture Compression BPTC, ARB, Jun. 6, 2016, 14 pages, Retrieved from: https://www.khronos.org/registry/OpenGL/extensions/ARB/ARB_texture_compression_bptc.txt.

Wikipedia, JPEG, Wikipedia The Free Encyclopedia, Feb. 1, 2019, 29 pages, Retrieved from: https://en.wikipedia.org/wiki/JPEG.

Wikipedia, JPEG 2000, Wikipedia the Free Encyclopedia, Jan. 7, 2019, 17 pages, Retrieved from: https://en.wikipedia.org/wiki/JPEG_2000.

* cited by examiner

TEXTURE COMPRESSION USING A NEURAL NETWORK

FIELD OF THE INVENTION

The present invention relates to image compression, and in particular to systems and methods for compressing texture maps using a neural network.

BACKGROUND

Modern texture block compression formats, such as BC7 and BC6H, achieve high-quality image data compression by providing a wide range of compression modes and compressing each pixel block with the most appropriate mode. The resulting compressed data may be stored on a persistent storage device where it can be quickly accessed as needed by applications.

SUMMARY

In accordance with a first aspect, this specification describes a computer-implemented method, comprising: receiving a texture map; segmenting the texture map into a plurality of pixel regions, and for each of the plurality of pixel regions: inputting a vector representation of the pixel region to a compression parameter neural network, wherein the compression parameter neural network is configured to: process the vector representation of the pixel region through one or more layers of the compression parameter neural network; and generate an output indicating a compression parameter set for compressing the pixel region. The method further comprises inputting the pixel region and the compression parameter set to a compressor, wherein the compressor is configured to compress the pixel region to a compressed representation of the pixel region in accordance with the compression parameter set. The method further comprises storing a compressed representation of the texture map to a memory accessible by a graphics processing unit, wherein storing the compressed representation of the texture map comprises storing the compressed representations of each of the pixel regions to said memory, and selectively decompressing portions of the compressed representation of the texture map using the graphics processing unit.

In accordance with a second aspect, the specification describes a computer-implemented method comprising: receiving a pixel region of a texture map; generating, using a compression parameter neural network, one or more compression parameters for a compressor; compressing, using the compressor, the pixel region to a compressed representation, comprising compressing the pixel region in accordance with the one or more compression parameters; and storing the compressed representation of the pixel region of the texture map to one or more memories accessible by a graphics processing unit.

In accordance with a third aspect, this specification describes a computer-implemented method for training a compression parameter neural network for use in compression of a texture map, comprising: receiving a plurality of training pixel regions and a plurality of respective gold standard compression parameter sets; inputting a vector representation of one of said plurality of training pixel regions to a compression parameter neural network, wherein the compression parameter neural network comprises a plurality of neural network layers and a plurality of neural network weights; in response to the inputting, generating a compression parameter set for said pixel region using the compression parameter neural network; and training the compression parameter neural network, comprising updating one or more neural network weights of the plurality of neural network weights to minimise a loss measure based at least in part on a comparison between the generated compression parameter set and the corresponding gold standard compression parameter set.

BRIEF DESCRIPTION OF THE DRAWINGS

Certain embodiments of the present invention will now be described, by way of example, with reference to the following figures.

DETAILED DESCRIPTION

Example implementations provide system(s) and method(s) for improved handling of texture maps, e.g. for video game applications. For example, systems and methods described herein may reduce the persistent storage needed to store a texture map, and the time, computational resources and memory to transform a texture map into a block compression format on-the-fly.

In accordance with various example implementations, compression parameters for each pixel block in an image are determined using a compression parameter neural network. A compressed representation of the image may be stored in a conventional compressed format such as JPEG2000 format. When the image is needed by an application requiring a block compressed representation, e.g. a 3D renderer, the JPEG2000 compressed version of the image is decompressed. Then the decompressed image is efficiently recompressed into the respective modern block compression format using compression parameters obtained using the compression parameter neural network. Compression parameter neural networks described herein can determine compression parameters with fewer computational resources than brute force methods used by many block compressors.

Significantly less persistent storage is required to store the JPEG2000 representation of the image than the block compressed representation. Therefore, the present invention enables less persistent storage to be used while still presenting the image to applications in a block compressed format, thus permitting selective access to regions of the compressed data for applications such as graphics rendering.

The described system is particularly advantageous in the context of video games. Many modern video games have a vast number of high-quality textures. By reducing the amount of persistent storage required to store these textures, the described system can greatly reduce the overall storage requirement for such video games. Moreover by reducing the amount of data needed to represent textures, in accordance with various implementations described in this specification, significant improvements may be made in network download sizes, game installation times and loading times.

Rendering System

Figure 1:
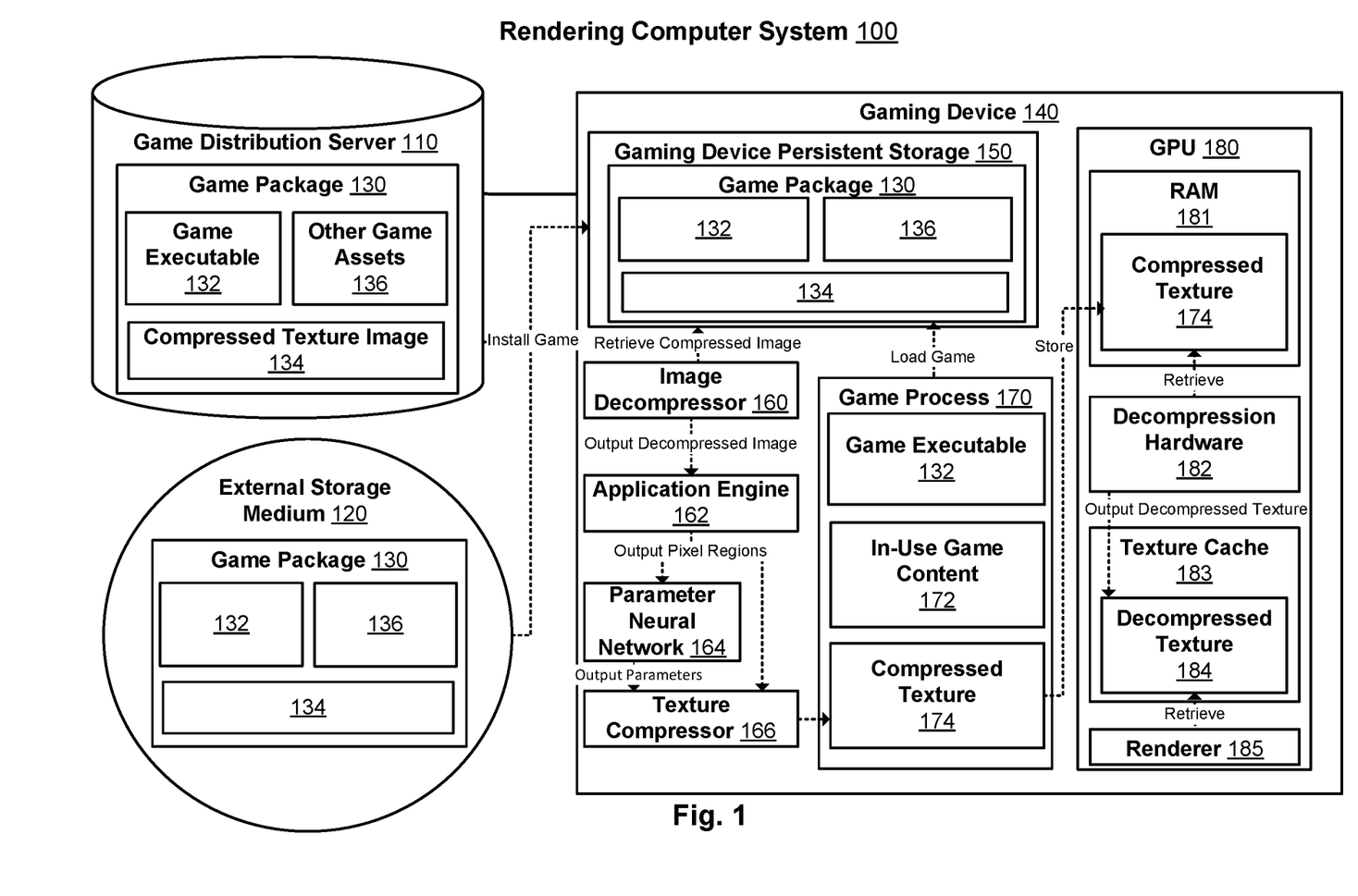
FIG. 1 is a schematic block diagram illustrating an example of a computer system configured to render textures.

Referring to FIG. 1, a retrieval and rendering system 100 for retrieving and rendering portions of a texture map.

The retrieval and rendering system 100 includes a gaming device 140, and either or both of a game distribution server 110 and an external storage medium 120. If present, the game distribution server 110 is configured to communicate with the gaming device 140 over a network. Examples of suitable networks include the internet, intranets, local area networks, wireless networks and cellular networks. Similarly, if present, the external storage medium 120 is configured to be read via a peripheral interface of the gaming device 140.

If present, the game distribution server 110 includes one or more processors (not shown), a memory (not shown) and a network interface (not shown). The processor(s) of each server execute suitable instructions stored in a computer-readable medium, e.g. memory. The network interface of the server is used to communicate with the other components of the system 100 to which the server is connected. Examples of suitable game distribution servers include files for game distribution services such as Origin, developed by Electronic Arts.

If present, the external storage medium 120 may be any suitable external storage medium, e.g. an optical disc or a game cartridge.

The game distributions server 110 and/or the external storage medium 120 contain a game package 130. The game package 130 may be a losslessly compressed archive, e.g. a Zip or 7z file or a compressed tar archive. The game package 130 may also be an installer or archive configured for use by a particular gaming platform. For instance, the gaming platform may be any of PC, Mac, Xbox One, PlayStation 4 or Nintendo Switch.

The game package 130 includes a game executable 132. The game package 130 also includes a conventionally compressed image 134 representing a texture map in a conventional image compression format, such as JPEG or JPEG-2000. Other game assets 136 are also part of the game package. The other game assets 136 are other data necessary for running the game. Examples of such data include markup-language files, scripts, images and music.

The gaming device 140 can be any computing device suitable for rendering graphics using a texture map. For example, the gaming device 140 may be any of a laptop computer, desktop computer, a games console, a tablet computer or a smartphone. For displaying the rendered graphics to a user of the gaming device (e.g. a video game player), the gaming device 140 includes or is connected to a display (not shown). Input device(s) (not shown) are also included or connected to the client. Examples of suitable input devices include games controllers, mice and keyboards.

The gaming device 140 uses the game distribution server 110 and/or external storage medium 120 to install the game from the game package 130 to its persistent storage 150. The game is installed to the persistent storage 150 using any suitable process. For instance, where the game package 130 is an installer, the game may be installed using the installer which is configured for the given gaming platform. Where the game package is a compressed archive, installing the game may involve transferring the compressed archive to the persistent storage and decompressing this transferred archive on the gaming device. It should be noted that while in typical embodiments, the game is installed to persistent storage 130, in some embodiments, the game may be streamed from the game distribution server 110 or run from the external storage medium 120.

When the game requests a texture map represented by the compressed image 134, the compressed image 134 representing the texture map is retrieved and decompressed by an image decompressor 160. The image decompressor 160 may for instance be a high-speed JPEG decompressor that operates via steps performing transformations reversing those performed during compression according to a method such as that illustrated in FIG. 4. Alternatively, the image decompressor 160 may be a high-speed JPEG-2000 decompressor. The image decompressor 160 may use one or more conventional processors, one or more GPUs or both to decompress the compressed image. The result of the decompression is raw pixel data of the texture map.

The pixels of the decompressed image are transferred to an application engine 162. The application engine 162 manages compression of the decompressed image to a texture compression format, such as a texture block compression format, where each region is compressed to a fixed number of bits. The application engine 162 segments the decompressed image in to appropriately sized pixel regions, e.g. 4×4 blocks, and outputs a vector representation of these pixel regions to a compression parameter neural network 164. The vector representation may be pixel-based, e.g. representing the intensity of each pixels RGB components with a vector element. The vector representation may also be feature based, e.g. based on edges and other features derived using convolutional layers.

The compression parameter neural network 166 is a neural network for generating compression parameters based on the vector representations of the pixel region. In some implementations the neural network may comprise a feedforward neural network having a softmax output layer. The neural network may be trained based on a cross entropy loss function, as described in more detail below. The neural network may receive a vector representation of the pixel region as an input, processes the received input through one or more layers of the neural network, and outputs a vector from which a corresponding set of compression parameters may be determined. The output vector may comprise a number of elements with each element having a value giving a probability that a compression parameter set represented by that element is an optimal parameter set (as estimated by the network). The compression parameter set corresponding to the element with the highest probability may then be selected for compressing the pixel region to texture compression format. The compression parameter set includes one or more compression parameters, which may for example indicate a compression mode, partition bits and/or rotation bits.

The texture compressor 166 receives the pixel region from the application engine 162 and the corresponding compression parameter set obtained using the neural network. The texture compressor uses the compression parameter set to compress the pixel region to a texture compression format, such as a texture block compression format, where each region is compressed to a fixed number of bits. By compressing each pixel region in this way, a compressed representation of the texture map in a texture compression format 174 may be obtained. The compressed representation of the texture map, herein referred to as the compressed texture 174, may then be output to the game process 170.

The compression operations performed by the texture compressor 166 may include determining the endpoints of one or more colour ranges, i.e. colour lines, represented in the pixel block and determining the indices, which indicate a colour along one of these color lines, for each pixel in the block.

The game process 170 is an instance of the game loaded from the persistent storage 150 into memory, and actively being executed by one or more processors of the gaming device 140. The game process 170 includes the game executable 132 previously described. The game process 170 also includes in-use game content. This in-use game content 172 is a portion of the other game assets 136 that are being used, or have been cached into main memory, by the game.

When one or more instructions of the game executable 132 requiring a portion of the texture map to be used for rendering is executed, the compressed texture 174 is loaded into the RAM 181 of the GPU 180 so that the GPU 180 can perform the requested rendering. It should be noted that the compressed texture 174 is significantly smaller than the uncompressed representation but is larger than the compressed image 134, since each of the regions of the texture map is compressed to a fixed number of bits.

The GPU 180 may use specialized decompression hardware 180 to retrieve the portion of the compressed texture 182 and decompress it in to raw pixel data usable for rendering. The GPU may use small portions of the texture map for rendering at any time. However as described above, the compressed texture 174 is adapted for selective access so that selected portions of the compressed texture may be loaded in to the decompression hardware 182. The decompression hardware 182 may comprise an application-specific integrated circuit adapted for performing texture decompression. The decompressed portion of the texture 184 may be output by the decompression hardware 182 and stored in the texture cache 184.

The decompressed texture 184 stored in the texture cache 183 is then used by the renderer of the GPU 185 to render a 3D scene and output it to, for example, a display connected to the gaming device 140. Operations performed during rendering may include vertex shading, geometry shading, triangle rasterization, and pixel shading. At least pixel shading operations use the decompressed texture.

Rendering Method

Figure 2:
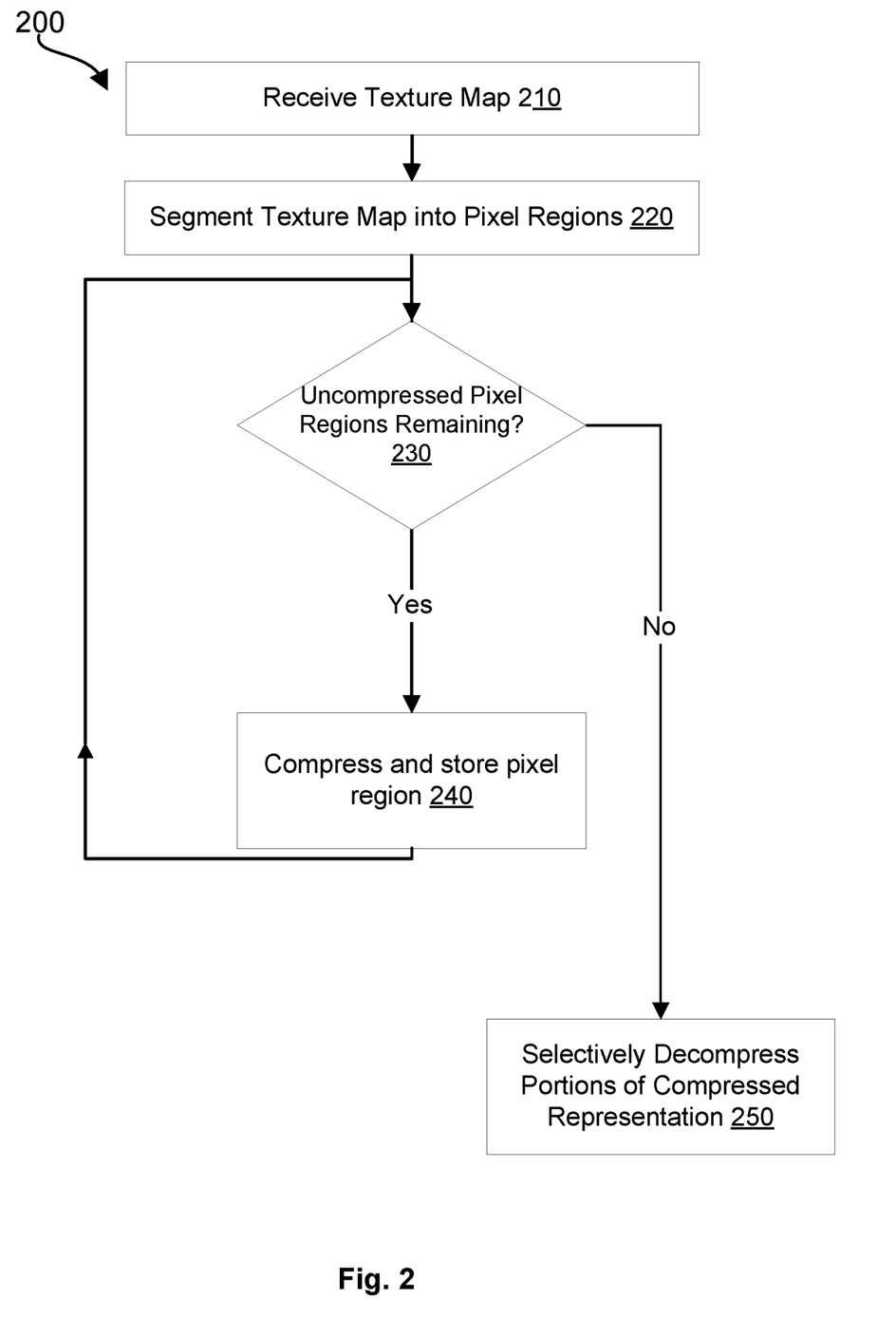
FIG. 2 is a flow diagram of an example method for compressing and decompressing textures.

FIG. 2 is a flow diagram of an example method by which portions of a texture map can be rendered. The method may be performed by executing computer-readable instructions using one or more processors of one or more computing devices of the rendering system 100.

In step 210, a texture map is received. The texture map may be raw pixel data which has been generated by decompressing a conventionally compressed image such as a JPEG or JPEG-2000 image. The texture map may be received by any suitable mechanism, e.g. an application programming interface (API) call or via an interprocess communication mechanism.

In step 220, the texture map is segmented into pixel regions. Each of the pixel regions may be of the same size, e.g. each pixel region may be a 4×4 block of the texture map. Segmenting the texture map may involve determining the boundaries of each pixel region. For instance, in the case of 4×4 blocks, determining a boundary of the pixel region may include determining the indices of the image corresponding to each pixel region. Segmenting the texture map may also involve storing each determined pixel regions as an element of an in-memory data structure.

In step 230, it is determined whether any uncompressed pixel regions remain. This determination may be made by checking whether any pixel regions that have not been compressed yet are present in an in-memory data structure storing the pixel regions of the texture map. Where pixel regions are deleted from the in-memory data structure, subsequent to compression, this determination may include checking whether any pixel regions remain in the in-memory data structure. If no uncompressed pixel regions remain, execution passes to step 250. Otherwise, one of the remaining uncompressed pixel regions, a current pixel region, is processed according to step 240.

Figure 3:
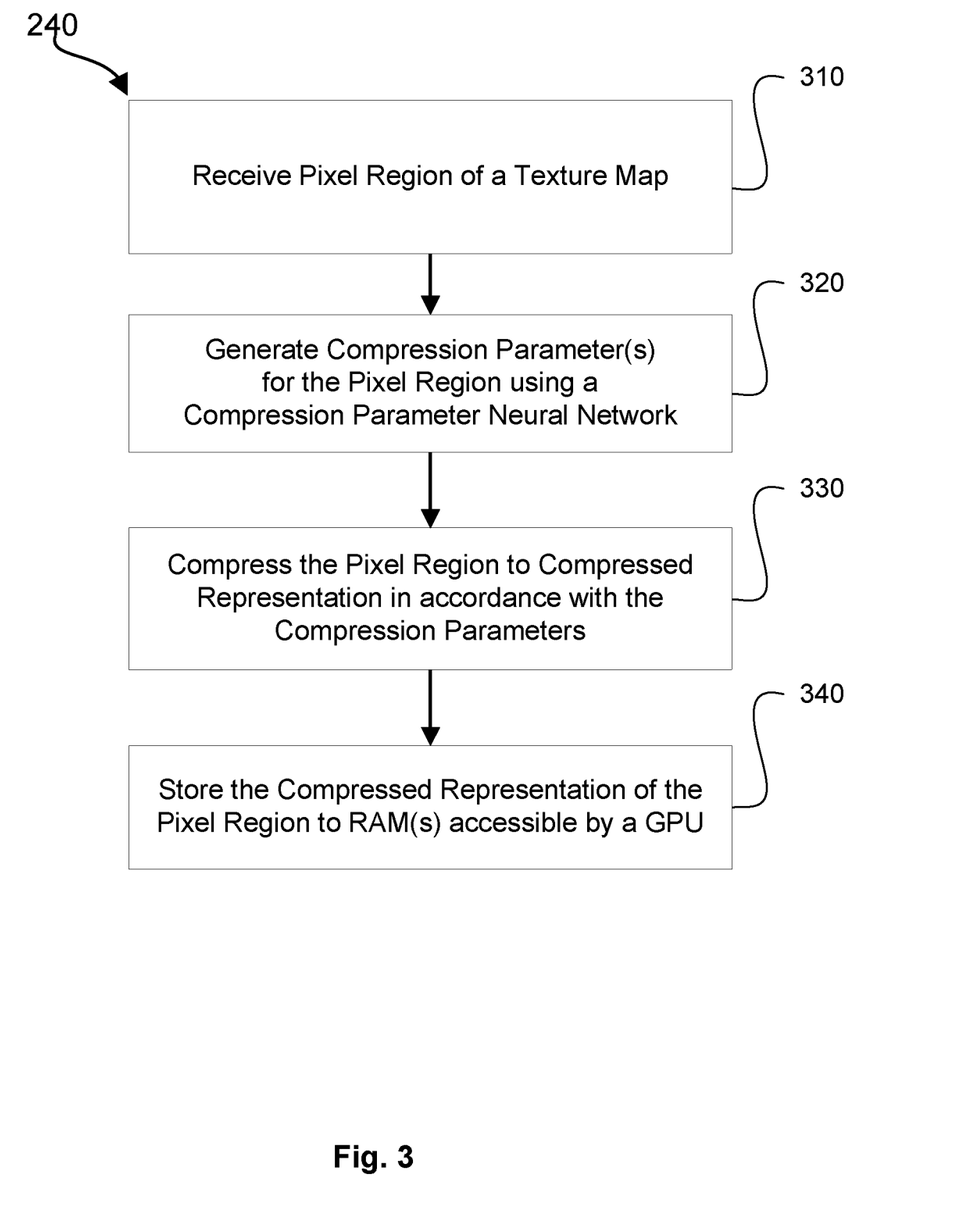
FIG. 3 is a flow diagram of an example method for compressing pixel regions and storing them to a GPU.

In step 240, the current pixel region is compressed to an appropriate compression format and stored to memory accessible by the GPU. The compression to the appropriate compression format includes determining appropriate compression parameters using the compression parameter neural network. The compression format may be BC7 or BC6H, or another suitable compression format such as ASTC. An example method by which compression and storage of the pixel region may be performed is illustrated in FIG. 3. Execution then returns to step 230.

In step 250, a portion of the compressed texture map is selectively decompressed by the GPU in to raw pixel data. The decompression is typically performed using a specialized component of the GPU configured to perform texture compression. Only small portions of the texture map are typically required for rendering at any time. The compression format of the texture map is typically a format suited to selective access, such as BC7 or BC6H. The portions of the texture map required can, therefore, be decompressed without substantially requiring decompression of the remainder of the texture map.

While, for the sake of clarity, the steps of this process have been described as sequential, it should be noted that these steps may be interleaved, repeated or performed in parallel. For instance, in some embodiments, multiple pixel regions may be compressed and stored in parallel.

Compression and Storage Method

FIG. 3 is a flow diagram of an example method for compressing and storing pixel regions of a texture map. In some embodiments, this example method is performed as step 240 described above and illustrated in FIG. 2. The method may be performed by executing computer-readable instructions using one or more processors of one or more computing devices of the rendering system 100.

In step 310, a pixel region of a texture map is received. In some embodiments, the pixel region may be a 4×4 block of pixels. The pixel region may then be converted in to a vector representation suitable for processing by a compression parameter neural network. The vector representation may be pixel-based, e.g. representing the intensity of each pixels RGB components with a vector element. The vector representation may also be feature based, e.g. based on edges and other features derived using convolutional layers.

In step 320, a compression parameter set is generated for the pixel region using a compression parameter neural network, as described above.

In step 330, the pixel region is compressed to a compressed representation using the corresponding compression parameter set generated using the compression parameter neural network. The compressed representation may be in a texture block compression format, where each region is compressed to a fixed number of bits. The texture block compression format may be BC7 or BC6H.

In step 340, the compressed representation is stored in random access memory accessible by a GPU. Data may be transferred to the random access memory via a bus of the computing device between main memory and a random access memory of the GPU. In other embodiments, step 330 is performed by the GPU so the compressed representation of the pixel region may be stored directly to the random access memory of the GPU. In instances where an integrated GPU is used, the random access memory accessible by the GPU is a portion of main memory and so the GPU may read the compressed representation from main memory.

Initial Image Compression

Figure 4:
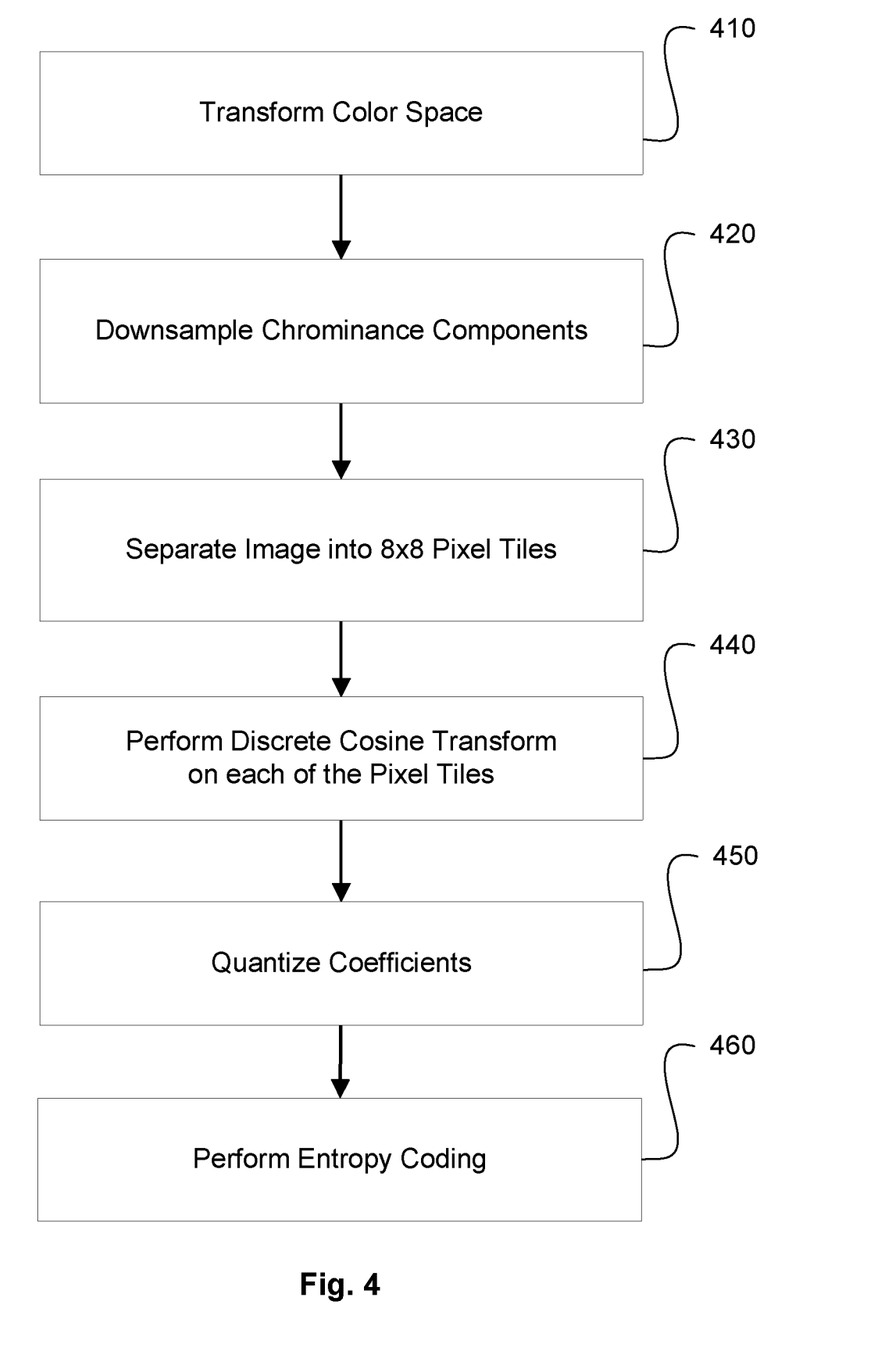
FIG. 4 is a flow diagram of an example method for compressing images.

FIG. 4 is a flow diagram of an example method by which an image, such as a texture map, may have been compressed to a JPEG file, e.g. the compressed texture image 134 of rendering system 100. This is intended as an example and the image may have been compressed using another method e.g. a method and corresponding compressor that compresses to JPEG-2000. The compressed texture image 134 may be stored in persistent storage 150 as shown in FIG. 1.

In step 410, the color space of the raw pixel data of the image is transformed. In the original color space, each pixel of the raw pixel data has red, green and blue components, so is said to be in the RGB color space. Each of these pixels is converted into a color space know as $Y'C_BC_R$. In this color space, each pixel has a luminance component, $Y'$, a blue chrominance component, $C_B$, and a red chrominance component, $C_R$. The luminance is the brightness of the pixel. The chrominance components provide a way by which the color information of the pixel can be conveyed separately to its brightness.

In step 420, the chrominance component is downsampled, i.e. its resolution is reduced. In JPEG, it is most commonly downsampled by a factor of two in each of the horizontal and vertical directions. Thus, the resolution of these components is decreased four-fold. Hence, the amount of data used to store these components is also reduced four-fold. This is done as the human eye is able to distinguish considerably finer detail in brightness than in color. Therefore, downsampling the chrominance components, has a minimal impact on the perceived quality of the image.

In step 430, the transformed, downsampled pixel data is split in to 8×8 tiles. The pixel data is split in to these tiles for subsequent processing by the compressor.

In step 440, a discrete cosine transform (DCT) is performed on each of the components of each of the pixel tiles. In order to do so, each component of each pixel tile is first shifted to a range centred on zero. This step reduces the dynamic range that the DCT needs to support. Performing the discrete cosine transform is a conversion from the space domain to the spatial frequency domain. The output from the transformation of a given component of a given tile is, therefore, a matrix of coefficients representing it in the frequency domain.

In step 450, each of the transformed components of the transformed tiles is quantized. Quantization involves reducing the precision of high frequency coefficients of the transformed tiles. Quantization achieves this by dividing each frequency coefficient in a transformed tile by a constant and then rounding it to the nearest integer. The precision of high frequency coefficients is reduced because they do not significantly affect the perceived quality of the image. The human eye can recognize small differences in brightness over a large area, i.e. low frequency coefficients, but struggles to distinguish rapid changes between close pixels, i.e. high-frequency coefficients.

In step 460, entropy coding is performed on the quantized tiles. First run-length encoding is performed. This is a simple scheme where repetitions of the same symbol, in this case the frequency coefficient, are represented using the symbol and its count rather than simply repeating the symbol. For instance, JJJJJ would be represented as J5. Huffman coding is then applied to the result. The principle of Huffman coding is to use fewer bits to represent more commonly encountered symbols, e.g. numbers or characters, and more bits to represent less frequently encountered ones. In this way, the overall number of bits used to represent a given sequence of symbols can be reduced substantially. In the context of the quantized tiles, Huffman coding can be applied to the quantized frequency components. As certain values are common after quantization, e.g. zero for higher frequencies, using fewer bits to represent these values can substantially reduce the data used to represent the quantized tiles. Both Huffman coding and run-length coding are instances of variable-length entropy codes. As such, the result of this process, i.e. a JPEG file, is not suitable for selective access to a given pixel and/or portion of the file, as it is not possible to easily determine where any given pixel is located in the file. For these reasons, it is usually necessary to decompress JPEGs as a unit or sequentially.

Other image compression schemes, such as JPEG-2000, may include some of the same concepts as the method of FIG. 4. For instance, JPEG-2000, transforms the color space, splits the image into tiles, performs a discrete wavelet transform (which is related to the discrete cosine transform), quantizes the resultant coefficients and performs a (different) variant of entropy coding on the result. More generally, any suitable variable bit-rate compressor may be used, for example a variable bit-rate compressor which uses perceptual scoring such as JPEG2000. For texture data that is not directly presented to users, but instead represents values used in rendering equations (e.g. normal or specular maps used to calculate lighting results), the first compressor may use a scoring methodology other than perceptual scoring. For diffuse (aka. albedo or color) textures, perceptual scoring is preferable.

Compression Parameter Neural Network Training Method

Figure 5:
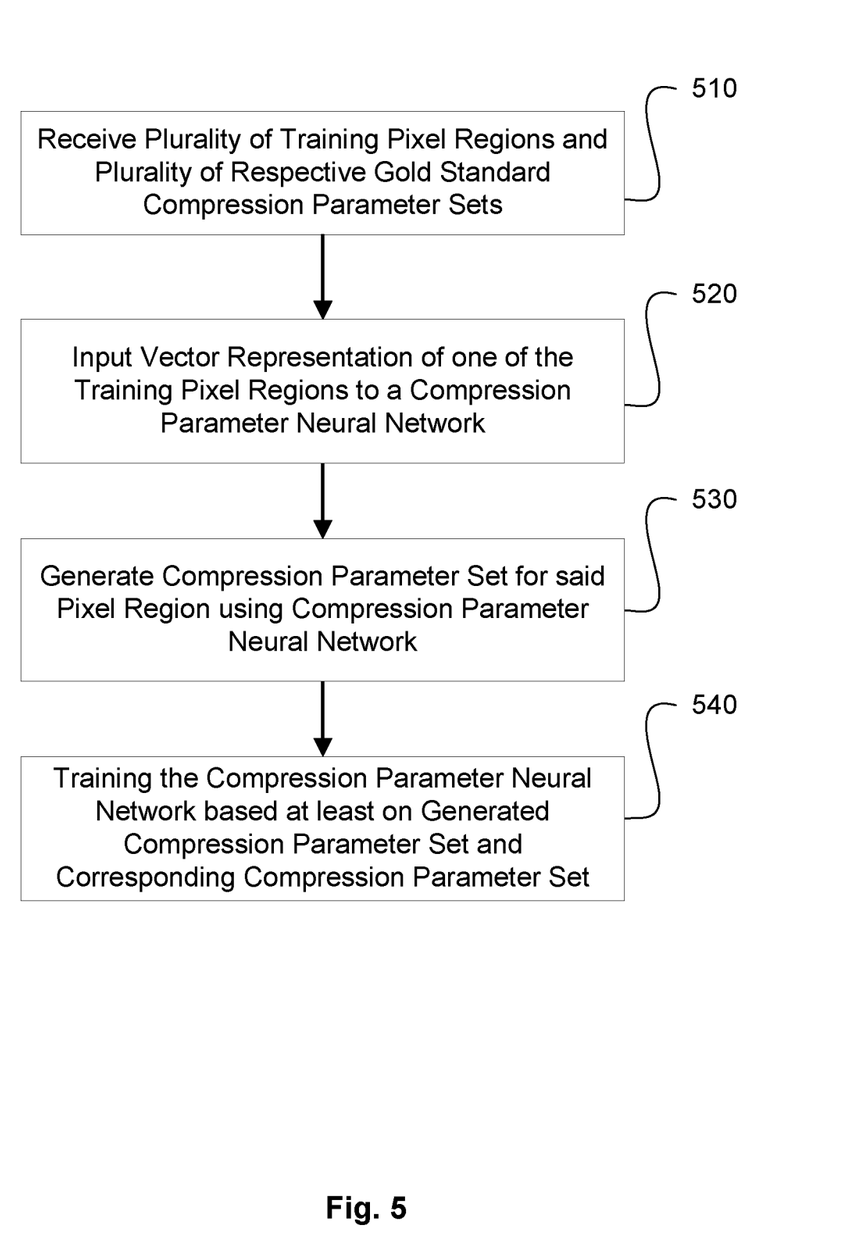
FIG. 5 is a flow diagram of an example method for training a neural network to generate compression parameters.

FIG. 5 is a flow diagram illustrating an example method of training a compression parameter neural network to generate compression parameters for a compressor using a plurality of training pixel regions and a plurality of respective gold standard compression parameter sets. This is intended as an example and other methods may be used instead. The method is performed by executing computer-readable instructions using one or more processors of one or more computing devices.

In step 510, a plurality of training pixel regions and a plurality of respective gold standard compression parameter sets are received.

The plurality of training pixel regions may be in the same format and from the same or similar sources as the pixel regions to be inputted to the network subsequent to training, e.g. the pixel regions used for training may be a number of 4×4 blocks from a plurality of texture maps. The plurality of training pixel regions may be received, individually in sequence, or in one or more batches. In embodiments where the plurality of training pixel regions is received in one or more batches, the pixel regions may be stored in an in-memory data structure such as an array.

The plurality of respective gold standard compression parameter sets may be determined using a benchmark compression parameter determiner, as part of or prior to execution of the method of FIG. 5. In some embodiments, the benchmark compression parameter determiner uses a significant amount of brute-force searching to determine the gold standard compression parameters. While brute-force searching may take some time, it allows the benchmark compression parameter determiner to determine optimal or near optimal, i.e. gold standard, compression parameters.

Figure 6:
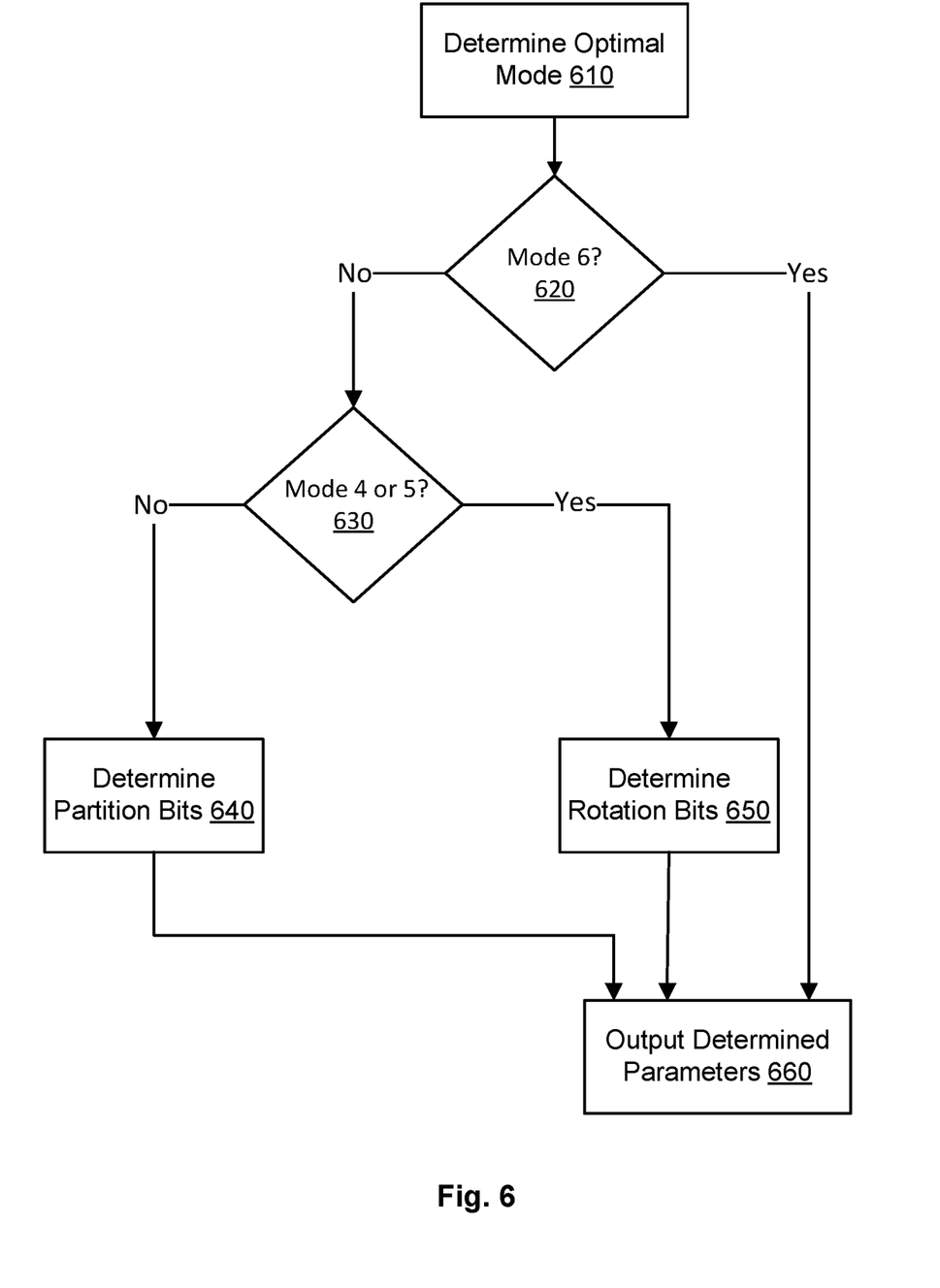
FIG. 6 is a flow diagram of an example method for generating gold standard compression parameters for a pixel region of a texture map.

The benchmark compression parameter determiner may comprise a known compression parameter determiner, e.g. a compression parameter determiner for BC7 format as illustrated in FIG. 6. In embodiments where the plurality of respective gold standard compression parameter sets are received in one or more batches, the plurality of respective gold standard compression parameter sets may be stored in an in-memory data structure such as an array.

In step 520, a vector representation of one of the plurality of training pixel regions is inputted to the compression parameter neural network. The vector representation may be pixel-based, e.g. representing the intensity of each pixels RGB components with a vector element. The vector representation may also be feature based, e.g. based on edges and other features derived using convolutional layers.

In step 530, compression parameters for said pixel region are generated using the compression parameter neural network based on the inputted vector representation of the training pixel region. The compression parameter neural network receives a vector representation of the pixel region as an input, processes the received input through one or more layers of the neural network, and outputs a vector from which a corresponding set of compression parameter may be determined. The vector may comprise a number of elements with each element having a value giving the probability of a parameter set represented by that element being the optimal parameter set (as estimated by the network). The compression parameter set corresponding to the element with the highest probability may then be selected. The compression parameter set includes one or more compression parameter, which may for example indicate a compression mode, partition bits and/or rotation bits.

In step 540, the compression parameter neural network is trained based, at least in part, on the gold standard compression parameters and the generated compression parameters for said training pixel region. This may include updating weights of the neural network to minimise a loss measure based on a comparison between the one or more generated compression parameters and the one or more gold standard compression parameter.

The weights of the neural network indicate the strength of connections between different neurons in the different layers of the neural network. As such, updating these weights changes the output of the neural network for a given input.

The loss measure to be minimised may be any suitable loss measure. Examples of suitable loss measures, also known as loss functions, include cross entropy loss, logistic loss and square loss. In this context, the values of the loss measure may be determined based on the probability assigned to the correct set of parameters, or the vector element relating thereto, by the neural network, and optionally, the probabilities that the network assigns to incorrect sets of parameters. For example, in the case of cross entropy loss, the loss measure would be:

$$-\log p_g - \sum_{i \neq g} \log(1 - p_i)$$

where $p_g$ is the probability given by the compression parameter neural network to the gold standard compression parameters and each of the $p_i$ being the probabilities given to the other parameters. The weights may then be updated using this loss measure using a method including backpropagation.

In some variations of the described method, multiple iterations of steps 520 to 540 may be performed for each of the plurality of training pixel regions. The number of iterations may be a fixed number or training may continue until a convergence criteria, e.g. a loss measure threshold, is reached.

While, for the sake of clarity, the steps of this process have been described as sequential, it should be noted that these steps may be interleaved, reordered or repeated. For instance, the gold standard compression parameters may be determined in advance for the plurality of training pixel regions prior to training. Likewise, steps 520 and 530 may be repeated for of each a number of training pixel regions prior to step 540. The loss measure may then be calculated as an average across all of the gold standard and generated compression parameters for these instances.

Gold Standard Compression Parameter Generation Method

FIG. 6 is a flow diagram illustrating an example method by which gold standard compression parameters for each training pixel region can be generated for use in training the compression parameter neural network. This is intended as an example and other methods may be used instead. The method is performed by executing computer-readable instructions using one or more processors of one or more computing devices of the storage system 100. In some embodiments, the method for generating the gold-standard compression parameters may be that used in known benchmark BC7 or BC6H compressors. However in conventional BC7 or BC6H compressors, parameters are generated by such a method during compression of the pixel region. In contrast, in embodiments of the present invention, the parameters are used for training of the compression parameter neural network, with the neural network used for generating the compression parameters used in compression.

Methods for determining gold standard compression parameters, such as that illustrated, allow for a wide range of modes and mode-specific parameters that effectively change the bitwise encoding scheme used for compressing each pixel region. These parameters are encoded within each compressed block. By enabling a wide range of different parameters to be used, it is possible to effectively select the bitwise encoding scheme most appropriate for the contents of a given texture block. On the other hand, determining the optimal mode (e.g. the mode that results in the lowest compression error) may in some cases involve a significant amount of brute-force searching.

In step 610, the optimal compression mode for the pixel region is determined. BC7 has eight different modes, referred to as modes 0 to 7. Each of these modes is adapted to blocks having differing content, such that they can all be compressed to a 16-byte representation while maintaining as high a quality as is possible. For instance, some blocks may have alpha, i.e. transparency, components while others may have no alpha component. In the first case, a compression mode that contains alpha information is used. In the second case, a mode that uses these bits to encode the color information with greater precision can be used. In some instances, it may be desirable to use a number of colors from discontinuous color ranges, also referred to as color lines. In these cases, color information is encoded to allow a greater number of discontinuous color ranges, also referred to as color lines, but the precision with which colors along each color line can be encoded is correspondingly reduced. Where multiple color ranges are not needed, e.g. in the case of a smooth gradient, a mode having a single color range can be used and the bits that were used to encode the multiple ranges can be used to more precisely encode colors along this color line.

The optimal mode for a given block may be determined by compressing the block to a compressed representation using the second compressor according to all of a number of suitable compression modes, e.g. all modes having an alpha component, and determining which of these results in the smallest error. The error may be defined as the difference between the pixels of the original block and those represented by compressed representation. The error may be determined by decompressing to a decompressed pixel block and comparing this decompressed texture block to the original texture block.

In the method described above, the optimal mode is determined by attempting each of a number of options and analysing which is best according to a given criteria is referred to as brute-force searching. Optimisation methods which include a brute-force search, such as that described, often select an optimal or near optimal result but are very computationally expensive.

In step 620, it is checked whether the determined optimal mode is mode 6. If the determined optimal mode is not mode 6, execution passes to step 630 where a further check is performed. If the determined optimal mode is mode 6, execution passes to operation 660 where the determined parameters, i.e. the mode in this case, are outputted.

In step 630, it is checked whether the determined optimal mode is either of mode 4 or 5. If the determined optimal mode is not mode 4 or 5, i.e. is any of modes 0-3 or 7, execution passes to step 640 where partition bits are determined. If the determined optimal mode is mode 4 or 5, execution passes to step 650 where rotation bits are determined.

In step 640, partition bits for the pixel region are determined. Partition bits are used for these compression modes as, in these compression modes, the colors of different pixels are taken from different color ranges, i.e. color lines. The partition bits define the subsets of pixels having colors from each line. With this defined, each pixel can be represented by its position on the given color line, and which color line should be used need not be indicated for each individual pixel. Depending on the mode, the partition bits either define two distinct subsets, where colors are taken from two color lines, or three distinct subsets where colors are taken from three color lines. As a small number of partition bits are used, four or six depending on the mode, the partition bits are limited to defining the most frequently observed partitionings. In the case that four bits are used, the partition bits select from the 16 most common partitions. In the case that six bits are used, the bits select from the 64 most common partitions. Examples of two subset partitions are illustrated in diagram 710 of FIG. 7. Examples of three subset partitions are illustrated in diagram 720 of FIG. 7.

In step 650, rotation bits are determined. Counterintuitively, the rotation bits do not refer to rotating the block but instead refer to swapping components. Modes 4 or 5 have an alpha range and three component ranges, i.e. red, green and blue ranges, defined. Without rotation, in these modes, the endpoints of the alpha range are represented with more precision. The rotation bits allow the bits used to represent the endpoints of the alpha range to be 'swapped' with those representing the endpoints of one of the component ranges. If such a rotation is performed, the alpha endpoints are represented with less precision and the endpoints of the chosen component are represented with more precision.

In step 660, the one or more compression parameters determined for the pixel region are outputted. In the case of mode 6, the one or more compression parameters are at least the mode. In the case of modes 4 and 5, they comprise the mode and rotation bits. In the case of the other modes, they comprise the mode and partition bits.

While, for the sake of clarity, the steps of this process have been described as sequential, it should be noted that these steps may be interleaved. For instance, as part of determining the error for each mode, the optimal partition bits or rotation bits for that mode may be determined. This error is then used to determine which of these modes is optimal.

Subset Partitions

Figure 7:
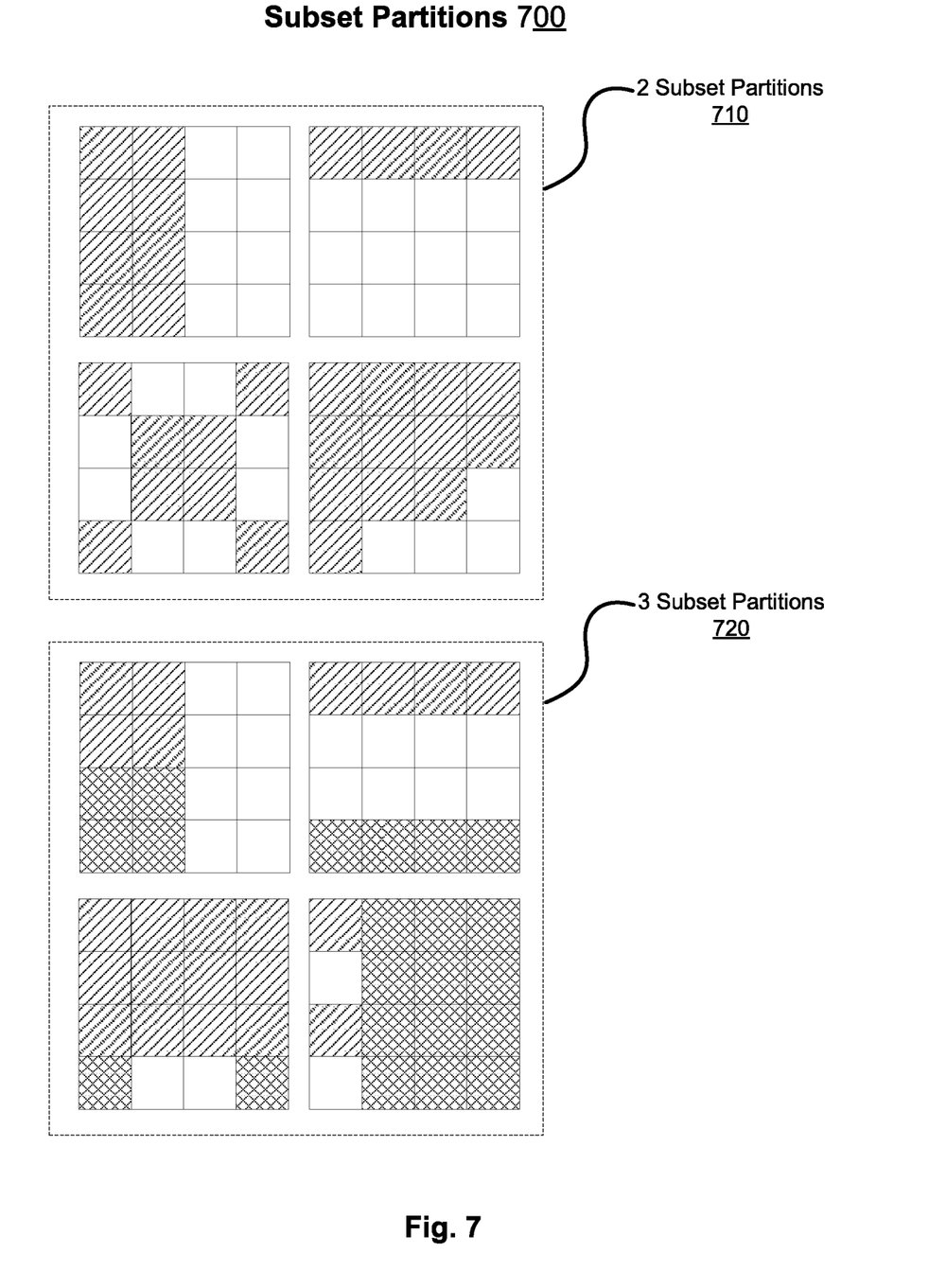
FIG. 7 is an illustration of exemplary BC7 partitions.

FIG. 7 is a diagram 700 illustrating a number of BC7 partitions for modes using six partition bits.

The two subset partition diagram 710 shows four of the 64 available two subset partitions. Each of the squares in the diagram corresponds to a pixel in a compressed block. The color of each pixel illustrated as diagonally hatched is defined with respect to a first color range, and the pixels illustrated as white are defined with respect to a second color range.

The three subset partition diagram 720 shows four of the 64 available three subset partitions. Each of the squares in the diagram corresponds to a pixel in a compressed block. The color of each pixel illustrated as diagonally hatched is defined with respect to a first color range, the pixels illustrated as white are defined with respect to a second color range, and the pixels illustrated as cross hatched are defined with respect to a third color range.

In the above description, numerous details are set forth. It will be apparent, however, to one of ordinary skill in the art having the benefit of this disclosure that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulation of physical quantities. Usually, though not necessarily, these quantities take the form of electrical or magnetic signals capable of being stored, transferred, combined, compared and otherwise manipulated. It has been proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "identifying," "classifying," reclassifying," "determining," "adding," "analyzing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purpose, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMS and magnetic-optical disks, read-only memories (ROMs), random access memories (RAMs), EPROMs, magnetic or optical cards, flash memory, or any type of media suitable for storing electronics instructions.

The words "example" or "exemplary" are used herein to mean serving as an example, instance, or illustration. Any aspect or design described herein as "example" or "exemplary" is not necessarily to be construed as preferred or advantageous over other aspects of designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" in intended to mean any of the natural inclusive permutations. That is, if X includes A; X includes B; or X includes both A and B, then "X includes A and B" is satisfied under any of the foregoing instances. In addition, the articles "a" and "an" as used in this specification and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinary meaning according to their numerical have an ordinal meaning according to their numerical designation.

The algorithms and displays presented herein presented herein are inherently related to any particular computer or other apparatus. Various general purpose systems may be used with programs in accordance with the teachings herein, or it may prove convenient to construct a more specialized apparatus to perform required method steps. The required structure for a variety of these systems will appear from the description. In addition, the present disclosure is not described with reference to any particular programming language. It will be appreciated that a variety of programming languages may be used to implement the teachings of the disclosure as described herein.

The above description sets forth numerous specific details such as examples of specific systems, components, methods and so forth, in order to provide a good understanding of several embodiments of the present disclosure. It will be apparent to one skilled in the art, however, that at least some embodiments of the present disclosure may be practiced without these specific details. In other instances, well-known components or method are not described in detail or are presented in simple block diagram format in order to avoid unnecessarily obscuring the present disclosure. Particular implementations may vary from these example details and still be contemplated to be within the scope of the present disclosure.

It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

The invention claimed is:

1. A computer-implemented method, comprising:
   receiving a texture map;
   segmenting the texture map into a plurality of pixel regions;
   for each of the plurality of pixel regions:
      inputting a vector representation of the pixel region to a compression parameter neural network which is trained to predict gold standard compression parameters based on a comparison between generated compression parameters and corresponding gold standard compression parameters in the training data, wherein the compression parameter neural network is configured to:
         process the vector representation of the pixel region through one or more layers of the compression parameter neural network; and
         generate an output indicating a compression parameter set for compressing the pixel region;
      inputting the pixel region and the compression parameter set to a compressor, wherein the compressor is configured to compress the pixel region to a compressed representation of the pixel region in accordance with the compression parameter set;
   storing a compressed representation of the texture map to a memory accessible by a graphics processing unit, wherein storing the compressed representation of the texture map comprises storing the compressed representations of each of the pixel regions to said memory; and
   selectively decompressing portions of the compressed representation of the texture map using the graphics processing unit.

2. The method of claim 1, wherein the pixel regions are fixed-size blocks of pixels.

3. The method of claim 1, wherein the compressed representations of each pixel region are represented using the same number of bits.

4. The method of claim 1, wherein the graphics processing unit comprises texture decompression hardware configured to selectively decompress portions of the compressed representation of the texture map.

5. The method of claim 1, wherein the graphics processing unit is configured to implement at least a part of the compression parameter neural network.

6. The method of claim 1, wherein the compressed representations of each of the pixel regions are in BC7 or BC6H format.

7. The method of claim 1, wherein the compression parameter set includes a compression parameter indicating at least one of a compression mode, one or more partition bits and/or one or more rotation bits.

8. The method of claim 1, wherein the compression parameter neural network comprises a feedforward neural network having a softmax output layer.

9. A computer-implemented method comprising:
   receiving a pixel region of a texture map;
   generating, using a compression parameter neural network which is trained to predict gold standard compression parameters by comparing generated compression parameters with corresponding gold standard compression parameters, one or more compression parameters for a compressor;

compressing, using the compressor, the pixel region to a compressed representation, comprising compressing the pixel region in accordance with the one or more compression parameters; and storing the compressed representation of the pixel region of the texture map to one or more memories accessible by a graphics processing unit.

10. The method of claim 9, wherein the compression parameter neural network is trained to minimise a loss function based on training data comprising:

a plurality of training pixel regions, and a corresponding plurality of gold standard compression parameters for each respective training pixel region.

11. The method of claim 9, wherein the pixel regions are fixed-size blocks of pixels.

12. The method of claim 9, wherein the compressed representations of each pixel region are represented using the same number of bits.

13. The method of claim 9, wherein the compressed representations of each of the pixel regions are in BC7 or BC6H format.

14. A computer-implemented method for training a compression parameter neural network for use in compression of a texture map, comprising:

receiving a plurality of training pixel regions and a plurality of respective gold standard compression parameter sets;

inputting a vector representation of one of said plurality of training pixel regions to a compression parameter neural network, wherein the compression parameter neural network comprises a plurality of neural network layers and a plurality of neural network weights;

in response to the inputting, generating a compression parameter set for said pixel region using the compression parameter neural network; and training the compression parameter neural network to predict gold standard compression parameters, comprising updating one or more neural network weights of the plurality of neural network weights to minimise a loss measure based at least in part on a comparison between the generated compression parameter set and the corresponding gold standard compression parameter set.

15. The method of claim 14, further comprising determining the respective gold standard compression parameter sets using a benchmark compression parameter determiner.

16. The method of claim 14, wherein updating the one or more neural network weights comprises performing backpropagation.

17. The method of claim 14, wherein the loss measure comprises cross entropy loss.

18. A non-transitory computer readable storage medium storing computer program code that, when executed by a processing device, cause the processing device to perform operations comprising:

receiving a texture map;

segmenting the texture map into a plurality of pixel regions;

for each of the plurality of pixel regions:

inputting a vector representation of the pixel region to a compression parameter neural network trained to predict gold standard compression parameters by comparing generated compression parameters with corresponding gold standard compression parameters, wherein the compression parameter neural network is configured to:

process the vector representation of the pixel region through one or more layers of the compression parameter neural network; and generate an output indicating a compression parameter set for compressing the pixel region;

inputting the pixel region and the compression parameter set to a compressor, wherein the compressor is configured to compress the pixel region to a compressed representation of the pixel region in accordance with the compression parameter set;

storing a compressed representation of the texture map to a memory accessible by a graphics processing unit, wherein storing the compressed representation of the texture map comprises storing the compressed representations of each of the pixel regions to said memory; and selectively decompressing portions of the compressed representation of the texture map using the graphics processing unit.

19. A non-transitory computer readable storage medium storing computer program code that, when executed by a processing device, cause the processing device to perform operations comprising:

receiving a pixel region of a texture map;

generating, using a compression parameter neural network trained to predict gold standard compression parameters by comparing generated compression parameters with corresponding gold standard compression parameters, one or more compression parameters for a compressor;

compressing, using the compressor, the pixel region to a compressed representation, comprising compressing the pixel region in accordance with the one or more compression parameters; and storing the compressed representation of the pixel region of the texture map to one or more memories accessible by a graphics processing unit.

20. An apparatus comprising:

at least one processor; and at least one memory including computer program code which, when executed by the at least one processor, causes the apparatus to:

receive a plurality of training pixel regions and a plurality of respective gold standard compression parameter sets;

input a vector representation of one of said plurality of training pixel regions to a compression parameter neural network, wherein the compression parameter neural network comprises a plurality of neural network layers and a plurality of neural network weights;

in response to the inputting of the vector representation, generate a compression parameter set for said pixel region using the compression parameter neural network; and train the compression parameter neural network to predict gold standard compression parameters by comparing generated compression parameters with corresponding gold standard compression parameters, wherein training the compression parameter neural network comprises updating one or more neural network weights of the plurality of neural network weights to minimise a loss measure based at least in part on a comparison between the generated compression parameter set and the corresponding gold standard compression parameter set.

* * * * *